United States Patent [19]

Kurihara

[11] Patent Number: 4,811,824
[45] Date of Patent: Mar. 14, 1989

[54] HUB CLUTCH

[75] Inventor: Sakuo Kurihara, Tochigi, Japan

[73] Assignee: Tochigi-Fuji Sangyo Kabushiki Kaisha, Tochigi, Japan

[21] Appl. No.: 84,082

[22] Filed: Aug. 11, 1987

[30] Foreign Application Priority Data

| Aug. 11, 1986 | [JP] | Japan | 61-188295 |
| Oct. 2, 1986 | [JP] | Japan | 61-151749[U] |
| Feb. 4, 1987 | [JP] | Japan | 62-15127[U] |

[51] Int. Cl.⁴ .................. F16D 11/00; F16D 43/00
[52] U.S. Cl. .................. 192/35; 192/67 R; 192/83; 192/93 A; 192/95; 403/1
[58] Field of Search ............ 192/35, 36, 93 A, 95, 192/83, 67 R; 403/1

[56] References Cited

U.S. PATENT DOCUMENTS

| 3,124,377 | 3/1964 | O'Brien et al. | 192/67 R X |
| 3,753,479 | 8/1973 | Williams | 192/89 A |
| 4,007,820 | 2/1977 | Kagata | 192/67 R |
| 4,223,772 | 9/1980 | Telford | 192/48.6 |
| 4,238,014 | 12/1980 | Petrak | 192/54 |
| 4,269,294 | 5/1981 | Kelbel | 192/54 |
| 4,281,749 | 8/1981 | Fogelberg | 192/36 |
| 4,282,959 | 8/1981 | Schachner | 192/35 |
| 4,287,972 | 9/1981 | Petrak | 192/54 |
| 4,327,821 | 5/1982 | Telford | 192/35 |
| 4,343,386 | 8/1982 | Schaefer et al. | 192/54 |
| 4,438,836 | 3/1984 | Kagata | 192/36 |
| 4,538,714 | 9/1985 | Kagata et al. | 192/54 |
| 4,620,622 | 11/1986 | Onedera et al. | 192/36 |
| 4,621,717 | 11/1986 | Onodera et al. | 192/36 |
| 4,718,527 | 1/1988 | Kurihara | 192/54 |

FOREIGN PATENT DOCUMENTS 0077956 6/1977 Japan ............ 192/67 R

Primary Examiner—Rodney H. Bonck
Attorney, Agent, or Firm—Wenderoth, Lind & Ponack

[57] ABSTRACT

A hub clutch used for a four-wheel driving free-wheel device in which, when a knob for manual operation and mounted on a casing is set to an automatic position, a pawl portion of a retainer becomes disengaged with a cam surface defined by a boss portion of the knob so that the device operates in the automatic condition, while when the knob is rotated in a manual lock direction, the pawl portion is engaged by the cam surface of the knob and is cammed to a lock position. When the pawl portion is in the lock position, the device assumes a manually locked state so that a drive gear and a clutch ring are maintained in an engaged condition with each other and stationary system members are separated from rotating system members. Accordingly, no contact force is applied to stationary system members when in the manually locked state.

7 Claims, 12 Drawing Sheets

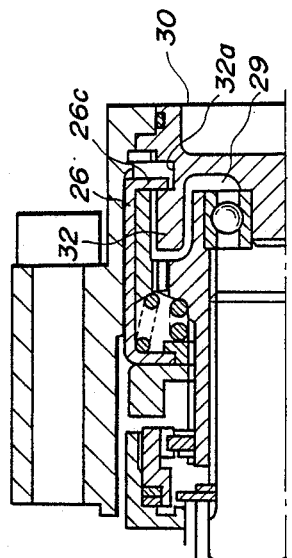
Fig. 4(b)
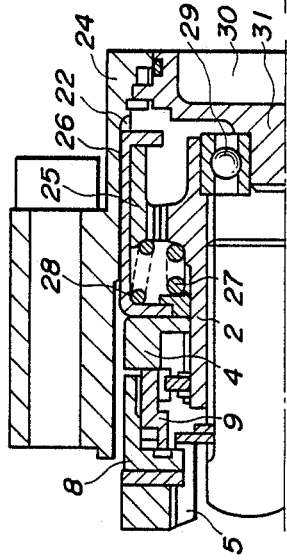
Fig. 4(a)
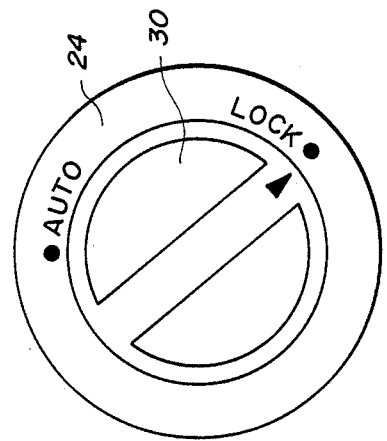
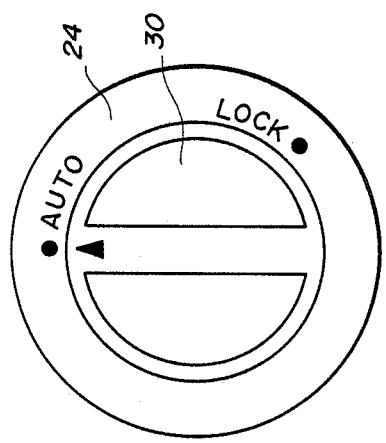

HUB CLUTCH

BACKGROUND OF THE INVENTION

1. Field of the Invention

This invention relates to a hub clutch used as a four-wheel drive device.

2. Description of the Related Art

There is a conventional automatic free-wheel hub clutch (hereinafter referred to simply as "hub clutch") which has been disclosed in U.S. Pat. No. 4,327,821 and which comprises a drive gear engaging a drive shaft and provided with clutching splines as well as other splines on the periphery thereof, a clutch ring slidably engaging splines extending on the inner circumference of a body in the axial direction thereof and having a clutchingspline on the inner circumference thereof, a return spring for inwardly urging the clutch ring and stretched between a clutch cap (cover) and said clutch ring in the axial direction (clutch-off direction), a cam follower disposed adjacent the clutch ring and engaged with the other splines on the periphery of said drive shaft at the inner circumference thereof in a transferable manner with respect to the axial direction and further provided with an inverted V-shaped projection projecting in the axial direction as well as protrusions (teeth) formed on the periphery of said inverted V-shaped projection at the extreme end thereof and protruding radially outward therefrom, a cam member having a V-shaped grooved cam surface for mating with and seating the inverted V-shaped projection of said cam follower and secured to a stationary system (locking nut), a movable cam provided coaxially around the cam member in a rotatable manner and having a substantially inverted V-shaped convex cam surface extending in the axial direction as well as a cam stop on the extreme end of said cam surface, and a drag shoe for braking said movable cam with said stationary system. A thrust washer is disposed between said drag shoe and said lock nut, and the hub clutch is constructed to withstand a pressig force transferred from the return spring to the clutch ring, the cam follower, the movable cam, and the drag shoe. A shift spring is coaxially mounted inside of said return spring and extends in the axial direction between the clutch cap and the drive gear. Said clutch ring and said cam follower are in face-to-face contact in a slidable manner.

In the above-described clutch hub, when the drive shaft beings to rotate, the drive gear rotates integrally there-with, so that torque is transmitted from said other splines to the cam follower. The inverted V-shaped projection of the cam follower which is disposed in the V-shaped grooved cam surfce of the cam member moves outwardly in the axial direction along said V-shaped grooved cam surface, the inverted V-shaped projection is moved out of said V-shaped groove, and then the projection engages with the inverted V-shaped convex cam surface of the movable cam (the rotation of which is suppressed by the drag shoe) and moves axially and outwardly along the cam surface. As the clutching splines on the periphery of the drive gear engage the clutch ring, the engagement or locking thereof becomes stronger with an increase in the outward movement of the projection in the axial direction along the convex cam surface of the movable cam, and when the protrusions engage the cam stop, the locking is completed. The maintenance of such a locked condition is facilitated by braking the movable cam with the drag shoe.

Furthermore, both the clutching splines and the other splines are aligned on the drive shaft adjacent each other in an axially transferable condition, and the shift spring stretched between the clutching spline (positioned outside in the axial direction0 and the clutch cap limits the outward displacement of the clutch ring in the axial direction.

Moreover, occasionally a vehicle must be maneuvered by repeating forward and backward movements in a completely meshed four-wheel drive (4WD) mode. In this case, since the drive shaft is rotated in a direction reverse to that in which the vehicle had just travelled, the cam follower is also rotated in the reverse direction, and the inverted V-shaped projection of the cam follower drops into the groove of the V-shaped grooved cam surface in the cam member. As a result, the clutch ring is pushed inwardly by means of an expandig force exerted by the return spring in the axial direction, whereby the clutching splines are disengaged.

In the above-described hub clutch, various disadvantages arise because the clutching splines become disengaged when the vehicle repeats forward and backward movements. For example, when a vehicle travelling in 4WD during a steep ascent comes to the end of a rough road, the vehicle must repeat forward and backward movements by turning the wheel in order to make a U-turn. As a result, there arises either a free position state or a poor engagement of the clutching spline so that the vehicle travels in an unlocked or incompletely locked condition. In such a situation, the vehicle begins moving in the two-wheel drive (2WD) condition by means of only the driving wheels. Thus, such a situation is particularly disadvantageous on a snow-covered road, a muddy road, in off-road conditions and the like.

Furthermore, when the vehicle travels in four-wheel drive, the drag shoe continually slides on a stationary bolt, so that a problem occurs in that the wear is accelerated and durability of the drag shoe decreses remarkably.

SUMMARY OF THE INVENTION

The present invention has been made in view of the above disadvantages of the prior art.

An object of the present invention is to prevent a decrease in the durability of a drag shoe during travel in four-wheel drive over a long period of time.

These objects will be attained by providing a hub clutch according to the present invention which comprises a cylindrical casing fixed to a wheel hub and provided with a spline on the inner circumference thereof as well as an opening extendig through an outside end surface thereof, a knob for manual operation mounted rotatably in said opening of the casing and provided with a boss portion forming a cam surface inclined with respect to the axial direction of the hub, a drive gear secured to the extremem end of an axis shaft at the periphery thereof and provided with a spline and a gear position on the periphery thereof, a cam member engaged with the spline of the drive gear in an axially transferable manner and provided with a convex cam portion on an axially inside portion thereof, an outer brake having a grooved cam portion the rotation of which is prevented by a stationary system and engaging said cam portion of the cam member, an inner brake provided with a grooved first cam portion disposed radially inward of said outer brake and engaged with said convex cam portion of the cam member and second cam portions defined on opposite sides of said grooved first cam portion, a clutch ring slidably supported by the spline on the inner circumference of said casing and meshed with a gear portion defined on the periphery of said drive gear when displaced outwardly in the axial direction, a return spring stretched between said cam member and a stepped portion defined on the periphery of said drive gear for urging said cam member inwardly in the axial direction, a retainer slidably contacting the outside surface of said cam member in the axial direction of said cam member and having a pawl portion engageable with the cam surface of said knob, and a shift spring stretched between said retainer and said clutch ring and urging said retainer against the cam member. The pawl portion of the retainer assumes an unengaged state with the cam surface on the boss portion of said knob when said knob is set to an automatic driving position. And, said pawl portion is engageable with the cam surface of said knob to assume the locked position when said knob is rotated in a manual locking direction. The retainer is arranged so as to limit the position of said clutch ring and cam member in the axial direction when said pawl portion is in said locked position.

BRIEF DESCRIPTION OF THE DRAWINGS

FIGS. 4(a) and 4(b) are partial longitudinal sectional views showing an automatically locked state and a manually locked state, respectively;

FIGS. 8 through 13 illustrate a fourth embodiment of the present invention wherein FIGS. 14 and 15 illustrate a fifth embodiment of the present invention wherein FIG. 14 is a longitudinal sectional view showing a hub clutch according to the fifth embodiment, and FIG. 15 is an enlarged front view showing the essential part of the hub clutch in FIG. 14.

DETAILED DESCRIPTION OF THE PREFERRED EMBODIMENTS

Figure 1:
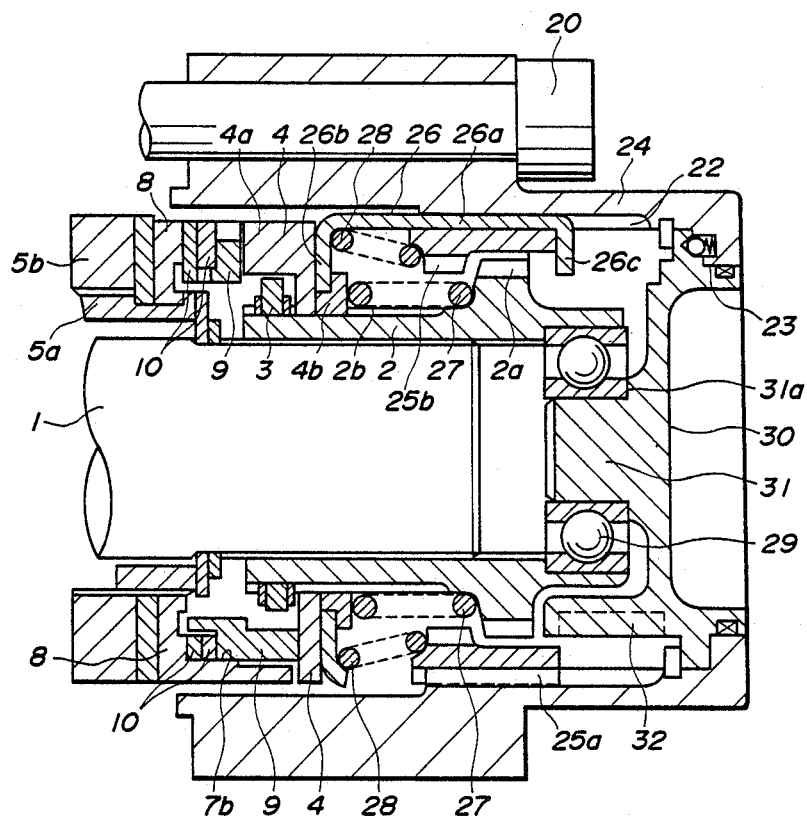
FIG. 1 is a longitudinal sectional view of a first embodiment of the present invention.

The hub clutch according to the present invention will be described in detail hereinbelow by referred to the accompanying drawings wherein FIG. 1 through FIGS. 4(a) and 4(b) illustrate the hub clutch in accordance with the first embodiment of the present invention which comprises a drive gear 2 fixedly connected to the end of an axle shaft 1 by means of a spline and having a gear portion 2a for facilitating a clutch engagement and a spline portion 2b on the periphery thereof, a cam member 4 transferably engaged with the spline portion 2b so as to be movable in the axial direction thereof and provided with an inverted V-shaped convex cam portion 4a projecting in the axial direction, an outer brake 8 the rotation of which is suppressed by a stationary system (composed of a spindle 5a, a lock nut 5b and the like) having a plurality of V-shaped grooved cam portions 7a mateable with an outer diametrical portion of the camportion 4a of the cam member 4, an inner brake 9 provided with a V-shaped grooved first cam portion 9a into which an inner diametrical portion of the cam portion 4a is insertable and second cam portions 9b defined on opposite sides of said first cam portion 9a, the innermost peripheral surface of inner brake 9 with respect to the axial direction operatively engaging the outside surface of the outer brake 8 through a friction plate 10 disposed between the outer brake 8 and the inner brake 9 to produce a required braking force, a casing 24 secured to a wheel hub (not shown) by means of a bolt 20 and having a spline 22 on the inner circumferential surface thereof, the end surface of casing 24 having an opening 23 extendign therethrough, a clutch ring 25 having a spline 25a engaging with the spline portion 22 of the casing 24 defined on the inner periphery thereof so as to be transferable in the axial direction and having a gear portion 25b for engaging and disengaging the gear portion 2a of said drive gear, a retainer 26 provided with a retainer arm 26a the rotation of which is suppressedby the spline 22 and a bent portion 26b extending in a radially inward direction from the innermost end of the retainer arm 26a with respect to the axial direction, a spring holder 4b contacting an inside diameter portion of the cam member 4 to support the bent portion 26b of the retainer at the inner peripheral surface thereof (preferably the dimensions of the spring holder 4b are such that it projects more toward the outer side of the hub clutch in the axial direction than does the bent portion 26b to engage with the return spring at the end surface thereof), a return spring 27 stretched between a stepped portion 3c notched in the periphery of the drive gear 2 and the end surface (containing the end surface of the retainer) of the spring holder 4b, and a shift spring 28 stretched between the bent portion 26b of the retainer and an inside wall surface of the clutch ring 25 for urging the clutch ring 25 outwardly in the axial direction. A manually adjustable knob 30 is disposed in the opening 23 in the casing 24 in a rotatable manner, and a projection 31 is formed on the inside of the knob at the central portion thereof. The end of the drive gear 2 protrudes from the end of the axle shaft 1, and a bearig 29 is disposed between the inner circumferential portion of the end of the drive gear 2 and the projection 31 of the knob. The inside diameter portion of the bearing 29 is engaged by a stepped portion 31a of the projection 31, while the outside diameter portion is engaged by a stepped portion of the drive gear 2 defined on the inner periphery thereof thereby preventing the same from slipping in the axial direction. A release plate 3 has a projection 3a, and is integral with and extends from the periphery of the drive gear. The release plate is engageable with a projection 9d on the inside of the inner brake 9. As shown in FIG.1, either the release plate 3 may be fixed by means of a snap ring after engaging the drive gear 2 by means of a spline, or the release plate 3 may be integrally formed with the drive gear.

Figure 5:
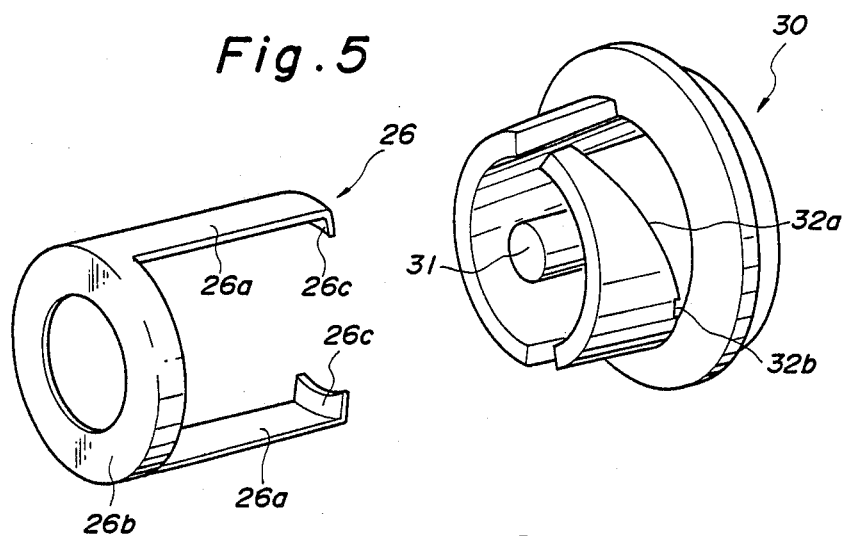
FIG. 5 is an exploded view showing a retainer and a knob.

An axially outside end portion of the retainer 26 extends radially inward as shown in FIGS. 1 and 5 to form a pawl portion 26c. The knob 30 has a boss portion 32 defined radially outward of the projection 31 and a cam surface 32a is formed on the peripheral surface of the boss portion 32. The cam surface 32a is an inclined surface extendign from an axial inside portion to an outside position thereof and which is engageable with the pawl portion 26c of the retainer 26. The axial inside portion of the cam surface 32a is opened so as to permit the engagement and disengagement of the cam surface with the pawl portion 26c and a recess 32b is formed to define a lock position on the axial outside portion of the cam surface 32a. FIG.4(a) shows a locked condition when the knob 30 is set to an automatic state, while FIG. 4(b) shows a locked condition when the knob 30 is set to a locked state by means of a manual operation. In the automatic state, the pawl portion 26c of the retainer 26 is cammed (by rotating the knob 30) to the axial inside portion of the cam surface 32a whereat the pawl portion 26c becomes disengaged from cam surface 32a, whereas, when the pawl portion 26c is transferred to the axial outside portion of the cam surface, the pawl portion 26c is locked at the lock position defined by recess 32b, whereby the clutch assumes a manually locked condition.

Figure 2A:
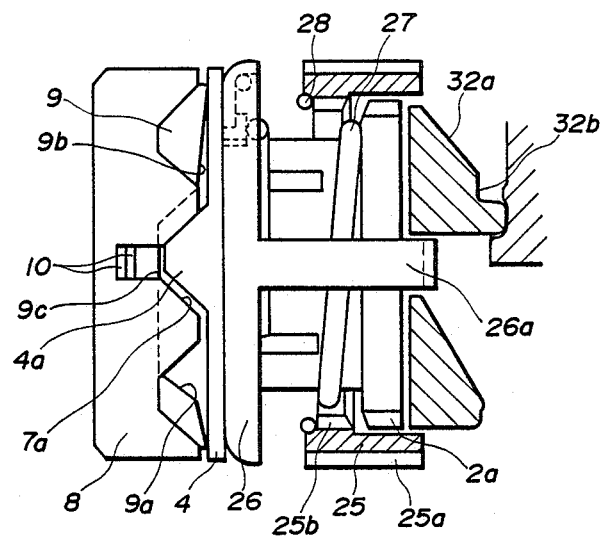
FIGS. 2(a) and 2(b) are longitudinal views partially in section showing an engaged state of each cam portion.

The operation in which the clutch-off state shown in FIGS. 1 and 2(a) is changed to the clutch-on state shown in FIGS. 2(b) and 4(a) will be described with respect to the automatic condition at which the pawl portion 26c of the retainer 26 has been transferred to the axial inside portion of the cam surface 32a by rotating the knob 30 so that the pawl portion 26c is disengaged with the cam surface 32a. First of all, when the driving force from the engine is transmitted to the axle shaft 1, the drive gear 2 and the cam member 4 start rotating integrally with shaft 1. In this case, since the cam member 4 urges the inner brake 9 inwardly in the axial direction, the inner brake 9 presses the friction plate 10 against the outer brake 8 thereby damping the inner brake 9. In the clutch-off state, the cam portion 4a of the cam member 4 is simultaneously disposed in and engaged with the grooved cam portion 7a of the outer brake 8 and the first cam portion 9a of the inner brake 9. When the cam member 4 begins to rotate under the rotation of the axle shaft 1, the cam portion 4a is displaced axially outwardly by the respective cam surfaces of the respective cam portions 7a and 9a due to thrust forces produced on the respective cam surfaces. The cam portion 4a rides onto the second cam portion 9b of the inner brake 9, and is displaced axially outwardly by the same. When the return spring 27 is compressed due to the axial displacement of the cam member 4, the clutch ring 25 is displaced axially outwardly by means of the shift spring 28, so that the gear portion 25b meshes completely with the gear portion 2a (FIG. 2(b) and FIG.(4)). Thus, when the complete clutch-on state is attained, the release plate 3 on the periphery of the drive gear engages with the projection 9d on the inner circumference of the inner brake 9 to stop the axial displacement of the cam member by directly rotating the inner brake 9.

Next, when a four-wheel drive mode is switched to a two-sheel drive mode, the vehicle is moved slightly in the direction opposite to that along which the vehicle had been moving after cutting off the transmission of driving force to the axle shaft 1, whereby the cam portion 4a of the cam member 4 is displaced axially inwardly along the cam portion 9b due to the urging force exerted inwardly along the cam portion 9b due to the urging force exerted by the return spring 27. Finally cam portion 4a drops into the cam portion 7a of the outer brake 8 and the cam portion 9a of the inner brake 9. As a result, a clutch-off condition is realized. The meshing engagement of the gear portion 25b of the clutch ring 25 and the gear portion 2a is released due to the displacement of the cam member 4 in the inward axial direction.

On the other hand, when the pawl portion 26c is shifted in the outward axial direction along the cam surface to be locked in the lock position defined by recess 32b, the manually locked condition shown in FIG. 4(b) is attained. In this manually locked position, the drive gear 2 and the clutch ring 25 are in a perfect regularly coupling state so that even if forward and reverse movements of the vehicle are repeated, there is no disengagement of the gear portion 2a from the gear portion 25b.

Accordingly, a perfect four-wheel drive condition can be maintained even when the vehicle starts on a steep slope or the like. In other words, either an automatic four-wheel driving state or a perfect manual four-wheel driving state can be selected dependent upon the conditions of the road on which the vehicle is running. Other than when a vehicle starts on a steep slope, the present invention is particularly useful when, for example, a vehicle is to be moved from a deep muddy road into which the wheels of the vehicle have sank while the vehicle was maneuvering in forward and reverse. In this case, both the gear portions 2a and 25b become disengaged during forward and backward movement of the vehicle if in automatic four-wheel drive mode, and such a situation in which the driving force is not transmitted to the wheels inhibits a rapid escape of the vehicle from the muddy road. However, if the knob has been set to the lock condition, the problem described above never occurs.

In addition, there is no ratcheting of the gear portion 2a with the gear portion 25b, and therefore the spline portion does not become worn.

Moreover, with manual locking, the spring holder 4b engaging the bent portion 26b of the retainer allows the return spring 27 to move axially outward while compressing the same, and the urging force of the return spring 27 is not exerted on the cam member 4. For this reason, the sliding movement is not accompanied with a pressure contacting force applied to the inner and outer brakes 9 and 8 when the vehicle is manually locked in a four-wheel drive. Hence, the durability of the brakes can be improved. Even if the brake is to be used after the lapse of its useful like or the brake has been broken, the changeover of 2WD to 4WD and vice versa can be manually performed.

Figure 6:
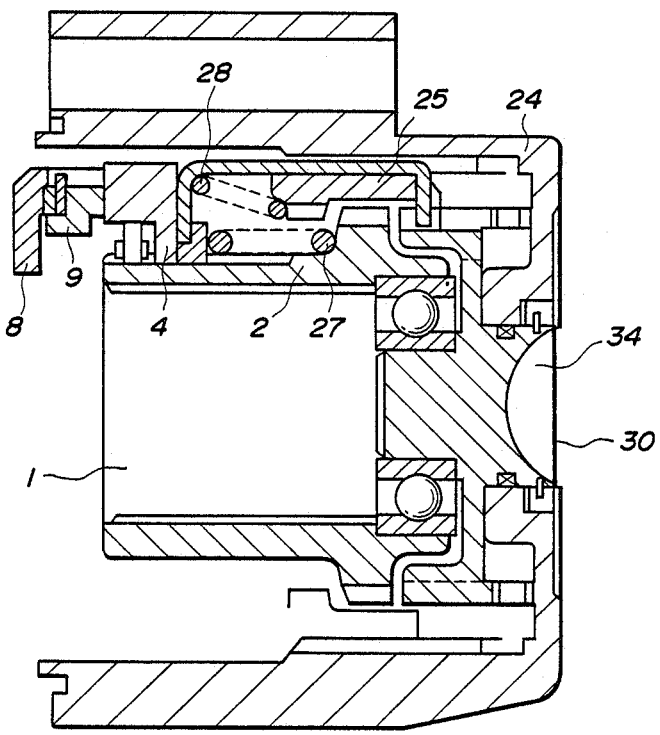
FIG. 6 is a longitudinal sectional view of a second embodiment according to the present invention.

Next, FIG. 6 illustrates the second embodiment of the present invention wherein like reference numerals designate like or corresponding parts in said first embodiment, and the description of elements and of the operation common to the first embodiment will be omitted. The second embodiment differs from the first embodiment in that the rotation of the knob 30 is not directly carried out by fingers, but by a driving tool. More specifically, a recess in the end surface of the knob is sufficiently defined in order to allow the knob to be easily manipulated by fingers in the first embodiment, and therefore, the length of the hub clutch in the axial direction must be relatively long. On the other hand, in the second embodiment, shallow groove 34 is sufficient for receiving the end of a tool, and as a result the length of the hub clutch can be relatively short in the axial direction thereof. The use of such a tool is also easier and is better suited for developing the force required for rotating the knob.

Figure 7:
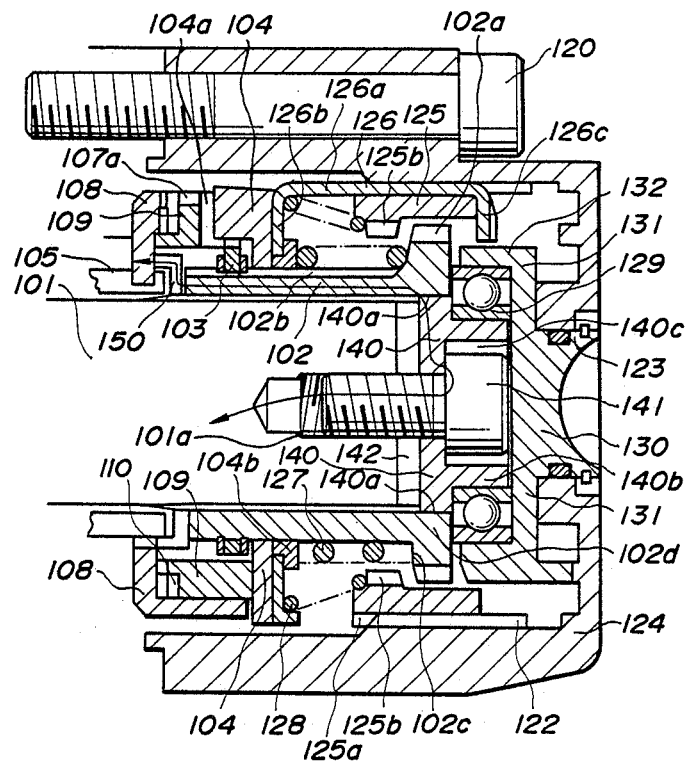
FIG. 7 is a longitudinal sectional view of a third embodiment according to the present invention.

Next, FIG. 7 illustrates the third embodiment of the present invention wherein a hub clutch comprises a drive gear 102 fixedly connected to the end of an axle shaft 101 by a spline and having a gear portion 102a for facilitating clutch engagement and a spline portion 102b on the periphery thereof, a cam member 104 transferably engaged with the spline portion 102b so as to be movable in the axial direction thereof and provided with an inverted V-shape convex cam portion 104a projecting in the axial direction, an outer brake 108 the rotation of which is suppressed by a stationary system (composed of a spindle 105, a lock nut and the like) and having a plurality of V-shaped grooved cam portions 107a mateable with an outer diametrical portion of the cam portion 104a of the cam member 104, an inner brake 109 provided with a V-shaped grooved first cam portion, an inner brake 109 provided with a V-shaped first cam portion into which an inner diametrical portion of the cam portion 104a is insertable and second cam portions defined on opposite sides of said first cam portion, the innermost peripheral surface of inner brake 109 with respect to the axial direction operatively engaging the outside surface of the outer brake 108 through a friction plate 110 disposed between the outer brake 108 and the inner brake 109 to produce a required braking force, a casing 124 secured to a wheel hub (not shown) by means of a bolt 120 and having a spline 122 on the inner circumferential surface thereof, the end surface of casing 124 having an opening 123 extending therethrough, a clutch ring 125 having a spline 125a engaging with the spline portion 122 of the casing 124 defined on the inner periphery thereof so as to be transferable in the axial direction and having a gear portion 125b for engaging or disengaging the gear portion 102a of said drive gear, a retainer 126 provided with a retainer arm 126a the rotation of which is suppressed by the spline 122 and a bent portion 126b extending in a radially inward direction from the innermost end of the retainer arm 126a with respect to the axial direction, a spring holder 104b contacting an inside diameter portion of the cam member 104 to support the bent portion 126b of the retainer at the inner peripheral surface thereof (preferably the dimensions of the spring holder 104b are such that it projects more toward the outer side of the hub clutch in the axial direction than does the bent portion 126b to engage with the return spring at the end surface thereof), a return spring 127 stretched between a stepped portion 102c defined on the periphery of the drive gear 102 and the end surface (containing the end surface of the retainer) of the spring holder 104b, and a shift spring 128 stretched between the bent portion 126b of the retainer and an inside wall surface of the clutch ring 125 for urging the clutch ring 125 outwardly in the axial direction. An adjustable knob 130 is disposed in the opening 123 in the casing 124 in a rotatable manner, and a disc-shaped flange portion 131 as well as a boss portion 132 extending inwardly from the peripheral end of the flange portion 131 and which will be described hereinbelow are formed on the inside of the knob 130. The end 102d of the drive gear 102 projects slightly beyond the end of the axle shaft 101. A locational member 140 is fixed to the end surface of the axle shaft 101 by a bolt 141 and has different sized diametrical portions wherein a first larger diametrical portion 140a fixedly supports the end 102d of the drive gear, while the second smaller diametrical portion 140b supports a ball bearing 129. The end 102d of the drive gear 102 is centered by means of the first larger diametrical portion 140a of the locational member 140 so that the centering of other parts to be assembled to the drive gear 102 from behind the same may be easily and accurately carried out. Furthermore, with respect to the second smaller diametrical portion of the locational member 140, the knob 130 and the casing 124 (the clutch ring 125) are also simultaneously centered, so that the positional relationship between the drive gear 102 and the clutch ring 125 is a precise one. From the viewpoint that the most important operating characteristic of a hub clutch is particularly smooth meshing of the drive gear 102 with the clutch ring 125, it is advantageous for the respective parts on the side of the drive gear 102 to be simultaneously centered with the respective parts on the casing side. A shim 142 may be disposed between the locational member 140 and the end surface of the axle shaft 101. The inside diameter portion of the bearing 129 is supported by the second diametrical portion 140b of the locational member 140, while the inner circumferential surface of the boss portion 132 of the knob 130 is rotatably journaled to the outside diameter portion of the bearing 129. The bolt 141 is threaded into a tapered hole 101a in the end surface of the axle shaft 101, the head portion of the bolt 141 disposed in a recess 140c defined at the central portion of the centering member 140 so as not to contact the nob 130. For this reason, loosening and tightening of the bolt due to relative rotation between the knob 130 (the casing 124 and the like) and the axle shaft 101 is prevented.

A projection 103 of the release plate is engageable with a projection on the inside of the inner brake 109. An appropriate space is defined between the drive gear 102 and the spindle 105 comprising the stationary system. A thrust member 150 engages the drive gear 102 and the outer brake 108, while the same does not engage with the spindle 105.

The axial outer end portion of the retainer arm 126a of the retainer 126 extends radially inward to form a pawl portion 126c as shown in FIG. 7. The knob 130 is provided with a boss portion 132 extending from the projection 131, and a cam surface is defined on the peripheral surface of the boss portion 132. This cam surface is an inclined surface extending from an inside to an outside portion, and the pawl portion 126c of the retainer 126 is engageable with the cam surface. The inside portion of the cam surface is open in the axial direction so that the pawl portion 126c can move into and out of engagement with the cam surface thereat, and a recess is defined on the axial outside portion of the cam surface to define a lock position. In the automatic condition, as shown in FIG. 7, the pawl portion 126c of the retainer 126 is cammed inwardly in the axial direction along the cam surface by rotating the knob 130, whereby the pawl portion 126c becomes disengaged from the cam surface, while in the manually locked condition, the pawl portion 126c is cammed outwardly in the axial direction along the cam surface to be locked at the lock position.

The clutching on and off operations of the hub clutch are the same as in the above-described embodiments with respect to both the automatically and manually operating condition.

Because of the employment of the locational member 140, the inconvenience associated with a countermeasure of, for example, increasing the axial length of the axle shaft to prevent a deterioration in the strength of the axle shaft, can be avoided. More specifically, the above-referred to inconvenience is such that the centering portion (a sliding portion defined by the larger diametrical portion 140a of the locational member 140 and the inside diameter of the drive gear 102 in FIG. 8) for locating both the drive gear 102 and the clutch ring 125 is transferred outwardly in the axial direction to increase the axial length of the hub clutch.

The locational member 140 is for positioning the axle shaft 101 as well as for centering both the drive gear 102 and the clutch ring 125. The ball bearign 129 is supported by the locational member 140 and the boss portion of the operation knob 130. Thus, the mechanism for supporting this bearing does not contribute to an increase the axial length of the resulting hub clutch.

Furthermore, since the urging force produced when the axle shaft is transferred axially inwardly by transverse G is distributed over a route represented by arrows in FIG. 7, the locating portion, i.e. the centering portion (a thrust member 150), is not slid so that the durability of the hub clutch is maintained.

FIGS. 8 through 13 illustrate the fourth embodiment of the present invention wherein a hub clutch comprises a drive gear 202 fixedly connected to the end of an axle shaft 201 by a spline and having a gear portion 202a for facilitating clutch engagement and a spline portion 202b on the periphery thereof, a cam member 204 transferably engaged with the spline portion 202b so as to be movable in the axial direction thereof and provided with an inverted V-shaped convex cam portion 204a projecting in the axial direction, an outer brake 208 the rotation of which is suppressed by a stationary system (composed of a spindle 205, a lock nut and the like) and having a plurality of V-shaped grooved cam portions 207a mateable with an outer diametrical portion of the cam portion 204a of the cam member 204; an inner brake 209 provided with a V-shaped grooved first cam portion 209a into which an inner diametrical portion of the cam portion 204a is insertable, second cam portions 209b defined on opposite sides of said first cam portion 209a, and an engaging projection 209f; a release plate 211 secured to the drive gear 202 at the periphery thereof by means of a snap ring 212 and from which extends an arm engageable with end portions 216a and 216b of a wire brake described in more detail below, a thrust washer 214 disposed between the axial inside end portion of inner brake 209 and the axial outside surface of the outer brake 208 thorugh a thrust bearing 213, a substantially C-shaped wire brake 216 disposed between the inner circumferential surface of the outer brake 208 and the inner brake 209, a casing 224 secured to a wheel hub (not shown) by means of a bolt 220 and having a spline 222 on the inner circumferential surface thereof, the end surface of casing 224 having an opening 223 extending therethrough, a clutch ring 225 having a spline 225a engaging with the spline portion 222 of the casing 224 defined on the inner periphery thereof so to be transferable in the axial direction and having a gear portion 225b for engaging and disengaging the gear portion 202a of said drive gear, a retainer 226 provided with a retainer arm 226a the rotation of which is suppressed by the spline 222 and a bent portion 226b extending in a radially inward direction from the innermost end of the retainer arm 226a with respect to the axial direction, a spring holder 232, a return spring 227 stretched between a stepped portion 202c defined on the periphery of the drive gear 202 and the spring holder 232, and a shift spring 228 stretched between the bent portion 226b of the retainer and the inside wall surface of the clutch ring 225 for urging the clutch ring 225 outwardly in the axial direction. The snap ring 212 is fitted to the drive gear 202 at the periphery thereof to prevent the respective parts 204, 211 and the like) disposed on the drive gear from slipping off.

The return spring 227 exerts a stronger urging force than does the shift spring 228. The knob 230 is disposed in the opening 223 of the casing 224 in a rotatable manner, and the boss portion 231 projects toward the inside. The end of the drive gear 202 projects from the axle shaft 201 and is supported at the inner circumference thereof by an end member 201a secured to the end of the axle shaft 201. the end member 201a is fixed to the axle shaft 201 by means of a bolt 201c extending through a spacer 201b. A bearing 229 is disposed between the peripheral surface of the end member 201a and the inner circumferential surface of the boss portion 231 of the knob. The release plate 211 extends radially outwardly of the drive gear and has an arm 211a that is engageable with end portions 216a and 216b of the brake 216.

Figure 8A:
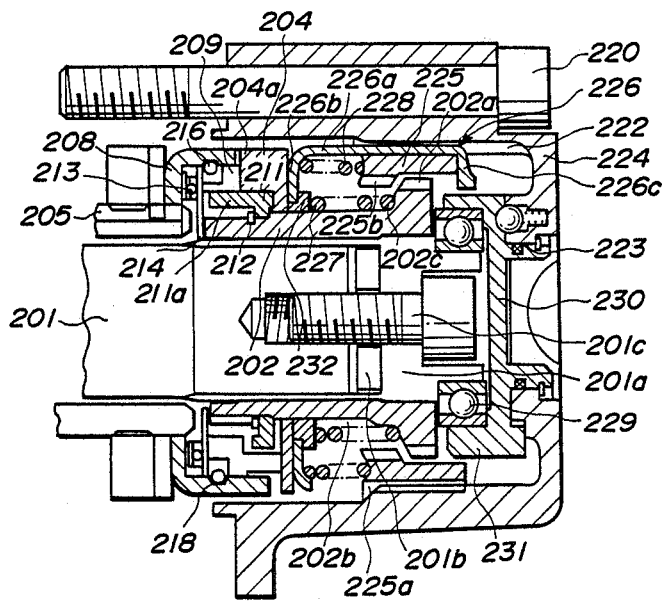
FIG. 8(a) is a longitudinal sectional view of the fourth embodiment of the present invention in a free condition.
Figure 8B:
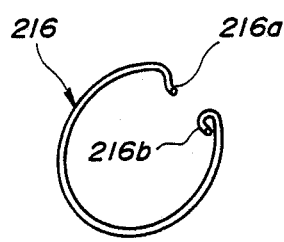
FIG. 8(b) is a perspective view of a wire brake.
Figure 8C:
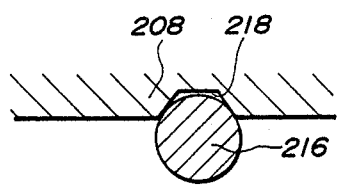
FIG. 8(c) is an enlarged sectional view showing the engagement of the wire brake and an outer brake.
Figure 8D:
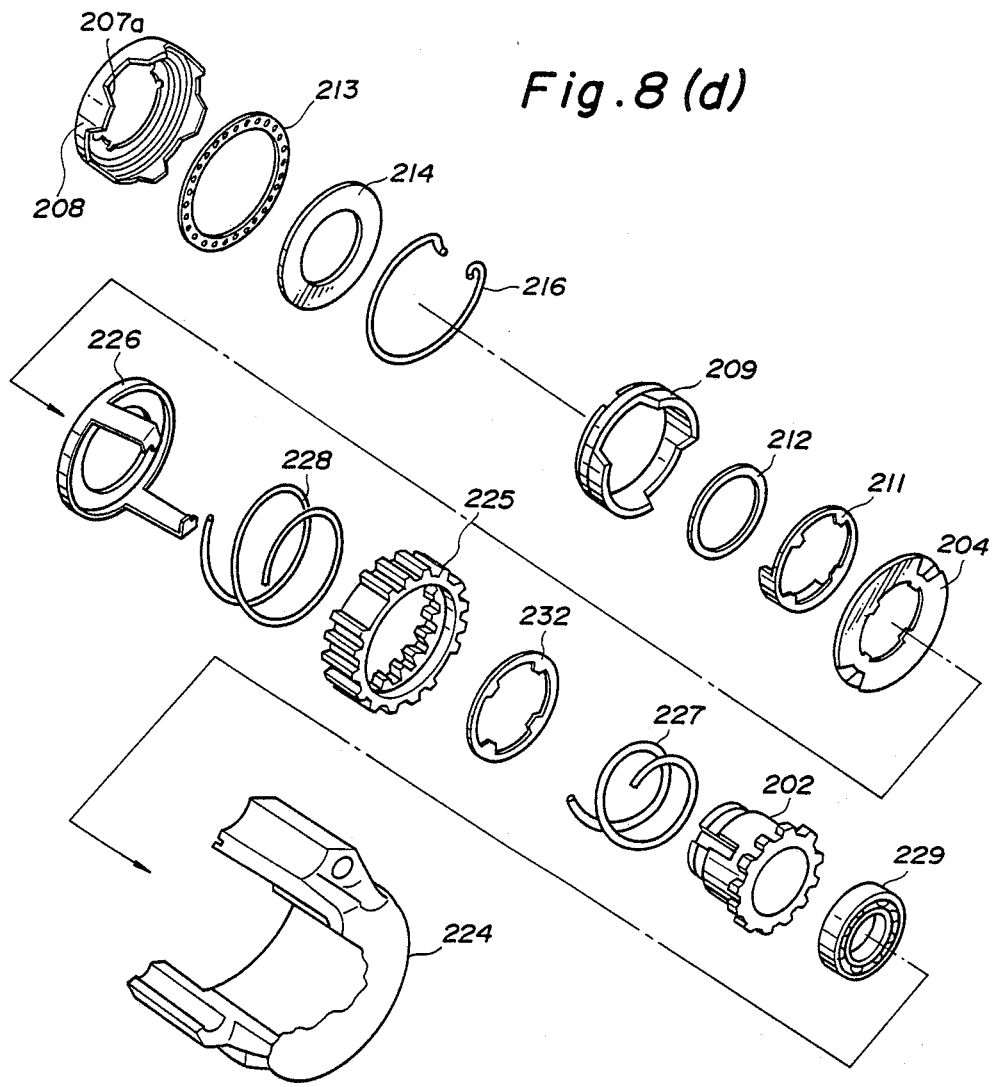
FIG. 8(d) is an exploded view showing the respective parts of the fourth embodiment, FIGS. 9(a), 9(b) and 9(c) each illustrate an engaged state of the respective cams and other parts in a free condition, FIGS. 10(a), 10(b) and 10(c) each illustrate an engaged state of respective cams and other parts during a change-over to the automatic locked condition, FIGS. 11(a) and 11(b) each illustrate an engaged state of respective members in the automatically locked condition, FIGS. 12(a) and 12(b) each illustrate an engaged state of respective members in the manually locked condition.
Figure 9A:
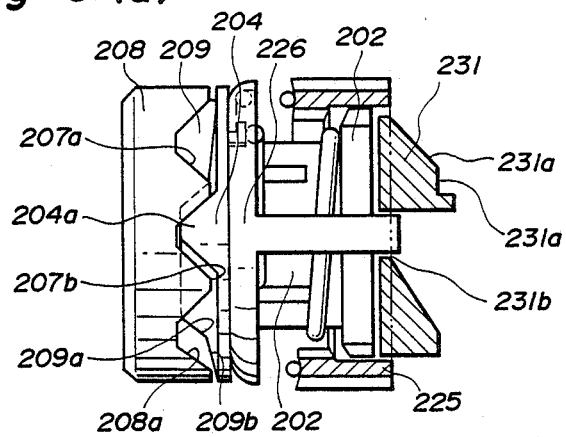
Figure 9B:
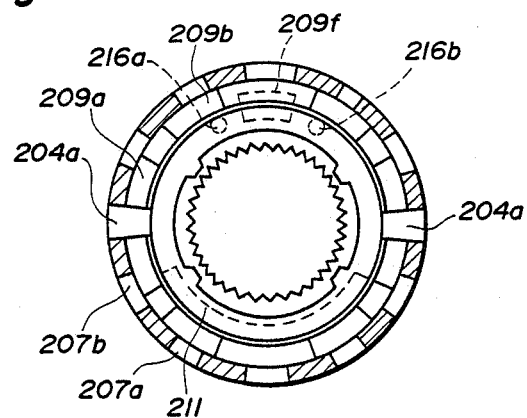
Figure 9C:
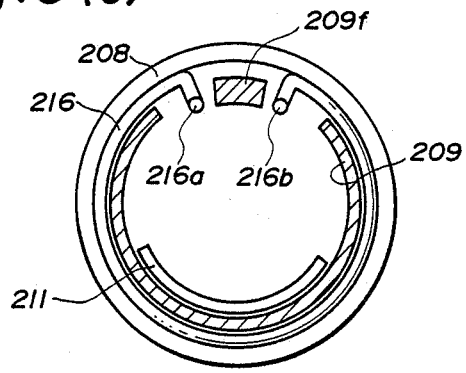
Figure 10:
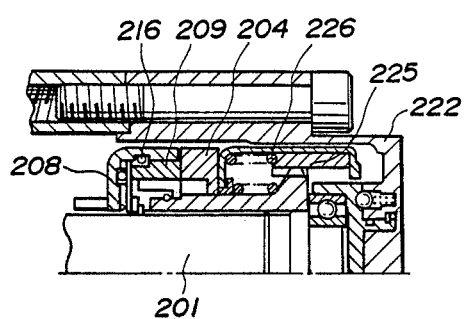
Figure 10:
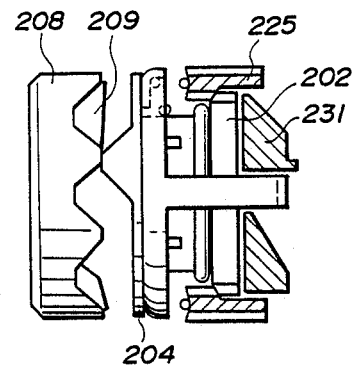
Figure 10:
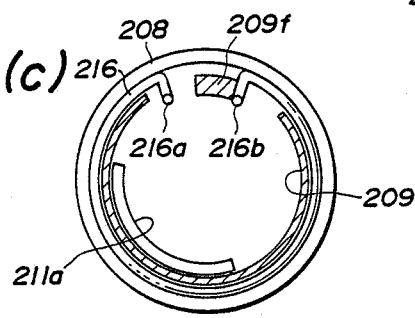
Figure 11:
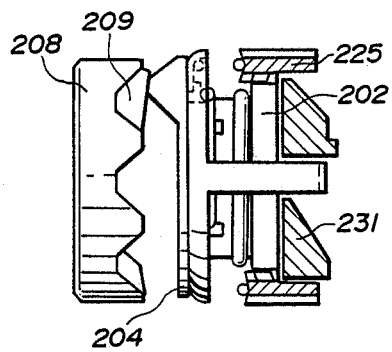
Figure 11:
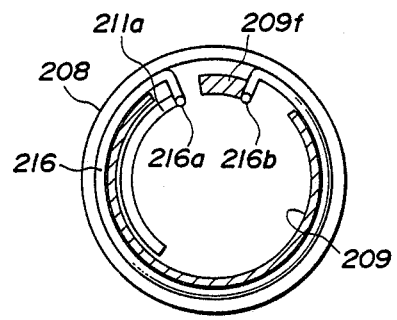

The brake 216 comprises a wire having a circular cross section and a substantially C-shape as shown in FIG. 8(b). Both of the ends 216a and 216b of the wire extend radially inward and then axially outward. A substantially V-shaped groove 218 is defined on the inner circumferential surface of the outer brake and in which the wire brake 216 slidably engages outer brake 208 in the circumferential direction thereof (FIG. 8(c)). The bottom portion of the groove 218 may be flat as shown in FIG. 8(c) or may be sharpened such as V-shaped.

The axial outside end portion of the retainer arm 226a of the retainer 226 extends radially inward as shown in FIG. 8(a) to form a pawl portion 226c. A cam surface 213a is defined on the peripheral surface of the boss portion 231. The cam surface 231a is an inclined surface extending from an axial inside to an outside portion thereof and which is engageable with the pawl portion 226c of the retainer 226. The axial inside portion of the cam surface 231 defines an opened portion 231b so as to permit the engagement and disengagement of the cam surface 231a with the pawl portion 226c, and a recess 231c is formed to define a lock position on the axial outside portion of the cam surface 231a. In the automatic state, the pawl portion 226c of the retainer 226 is cammed (by rotating the knob 230) to the axial inside portion of the cam surface 231a whereat the pawl portion 226c becomes disengaged from cam surface 231a whereas, when the pawl portion 226c is transferred to the axial outside portion of the cam surface, the pawl portion 226c is locked at the lock position 231c, whereby the clutch assumes a manually locked condition.

In the embodiment above, a driving force is not transferred to the axle shaft 201 during free travel (two-wheel drive) so that the axle shaft 201 does not rotate. Since the respective gear portions 202a and 225b are in a clutch-off (disengaged) state, the housing 224, the retainer 226, the knob 230, the clutch ring 225 and the like do rotate. The engaging projection 209f of the inner brake 209 is in a disengaged state with the end portions 216a and 216b of the wire brake 216.

When the clutch-off state shown in FIG. 8(a) is changed over to the clutch-on state shown in FIGS. 11(a) and (b), first, the driving force from the engine is transmitted to the axle shaft 201, and the drive gear 202 and the cam member 204 start rotating. The cam portion 204a of the cam member 204 initially disposed in the cam groove 207a of the outer brake 208 and the grooved cam portion 209a of the inner brake 209 begins to move outwardly in the axial direction while urging both the brakes 208 and 209 inwardly in the axial direction under a thrust force produced at a contacting portion of the cam groove 207a of the outer brake 208, being a stationary system, with the cam portion 204a. The cam portion 204a of the cam member 204 is displaced outwardly in the axial direction along the cam groove 207a of the outer brake 208 and rides completely up the groove 207a. Thereafter, the cam portion 204a abuts the second cam portion 209b of the inner brake 209 (FIGS. 10(b) and (c)). At this time, the inner brake 209 has already been rotated by the cam member 204, and the engaging projection 209f of the inner brake engages with an end portion 216b (or 216a) of the wire brake 216 and attempts to rotate the same. However, the wire brake 216 is expanded to pressingly contact an inclined inner wall surface defining the groove 218 of the outer brake 208, so that a remarkable rotating resistance is produced. As a result of the suppression of the rotation of the wire brake 216, the rotation of the inner brake 209 is also suppressed, and the cam portion 204a rides further up the second camportion 209b of the inner brake and is displaced further outwardly in the axial direction. When the cam portion 204a has ridden up the second cam portion 209b of the inner brake as shown in FIG. 11(a), the arm 211a of the release plate 211 engages the other end portion 216a of the wire brake 216 to rotate the same. Thus, the wire brake 216 contracts, and the rotating resistance between the wire brake and the outer brake 208 decreases remarkably. Then, the wire brake 216 is concurrently rotated with the inner brake 209 by means of the release plate 211. At this ti me, the clutch ring 225 is displaced outwardly in the axial direction due to the resiliency of the shift spring 228, and the gear portion 225b of the clutch ring meshes completely with the gear portion 202a of the drive gear thereby attaining a locked state. As a result, when a perfect clutch-on condition is obtained, the arm 211a of the release plate engages the projection 209f on the inner circumference of the inner brake 209 through the end portion 216a of the wire brake to directly rotate the same while contracting the wire brake 216. For this reason, a braking force that produces the sliding resistance becomes small, and the resistance due to relative rotation between both the brakes is reduced sufficiently enough so that no problems such as a decrease in the durability of parts and the like occur. The thrust bearing 213 and the thrust washer 214 also contribute to the prevention of wear of both the brake members 208 and 209 due to their sliding on one another.

When the four-wheel drive mode is changed over to a two-wheel drive mode, the vehicle is slightly moved in the direction opposite to that in which the vehicle had just been moving after the transition of driving force to the axle shaft 201 is ceased. As a result, the arm 211a of the release plate 211 is moved away from the end portion 216a or 216b of the wire brake so that the wire brake 216 is again urged in a radially outward direction by means of the engaging projection 209f of the inner brake and pressingly contacts the inner circumferential surface of the outer brake. The rotation of the inner brake 209 is suppressed by the wire brake 216 as when a free condition is changed over to a locked condition. Accordingly, the cam portion 204a of the cam member 204 is displaced inwardly in the axial direction along the second cam portion 209b. In this case, since the cam member 204 is urged axially inwardly due to an urging force exerted by the return spring 227, the cam portion 204a is easily displaced axially inwardly along the cam portion 209b, and finally falls into the cam portion 207a of the outer brake 208 and the cam portion 209a of the inner brake 209. As a result, a clutch-off condition is attained (FIG. 8(a) and FIGS. 9(a)–(c)). The meshing engagement of the gear portion 225b of the clutch ring 225 and the gear portion 202a is released by means of the urging force exerted by the return spring 227 during the displacement of the cam member 204 in the inward axial direction.

Figure 13A:
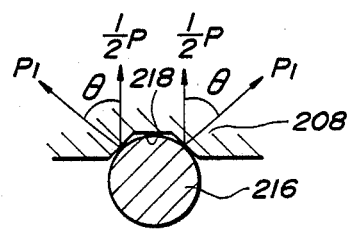
FIGS. 13(a) and 13(b) are enlarged sectional views each showing the relationship between contact pressure and a brake force in the sliding portion defined between the wire brake and the outer brake.
Figure 13B:
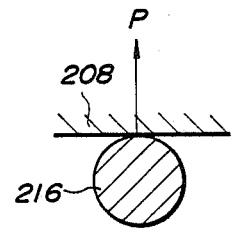

FIGS. 13(a) and 13(b) illustrate the engagement of the wire brake 216 disposed in a groove 218 with the outer brake defining said groove as compared to when no groove is defined on the outer brake. In FIG. 13(b) wherein no groove 218 is defined, if a contact force (contact pressure) applied to the surface of the outer brake is represented by P and coefficient of friction is represented by $\mu$, the braking force is $\mu P$. On the other hand, the contact pressure at two contact points is representedby $P_1 = P/2 \cos \Theta$ $(0 < \Theta < \pi/2)$, and the total respective braking force is $2\mu P_1 = \mu P/\cos \Theta$ in the case of FIG. 13(a) wherein the groove 218 is defined on the outer brake. In this case, since $\mu P/\cos\Theta > \mu P$, the contact pressure does not increase despite a remarkable increase of the braking force generated at the two contact points. Accordingly, the present embodiment has an advantage in that a high braking force can be attained, while the durability of the elements at the sliding portion does not remarkably decrease.

Moreover, in the present embodiment, the braking force can be increased significantly by simply modifying the dimensions of the groove so as not to require any remarkable change in design such as increase in spring force of the wire brake, an increase in the number of turns in the spring or the like.

In addition, since lubricating oil such as grease and the like is easily maintained in gaps each defined between the bottom surface of the substantially V-shaped groove 218 and the wire brake 216, wear of the sliding surface defining the groove 218 can be inhibited.

Figure 12A:
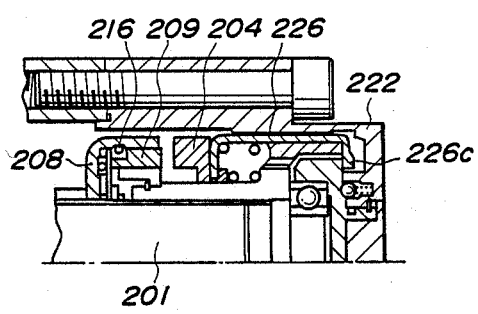
Figure 12B:
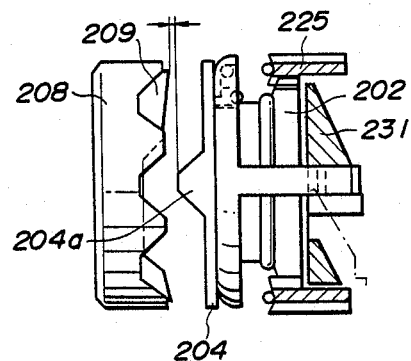

The automatic condition illustration in FIG. 8(a)–– FIGS.11(a) and (b) is attained when the pawl portion 226c of the retainer 226 is cammed (by rotating the knob 230) to the axial inside portion of the cam surface and the pawl portion 226c becomes disengaged from the cam surface, while the manually locked condition illustrated in FIGS. 12(a) and (b) is attained when the pawl portion 226c is cammed to the axial outside portion of the cam surface and the pawl portion is locked at the lock position.

Figure 14:
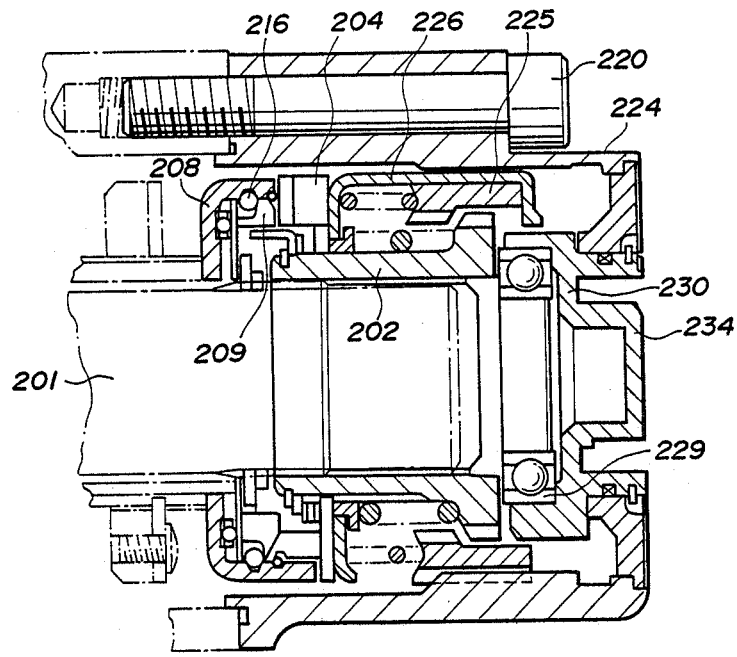
Figure 15:
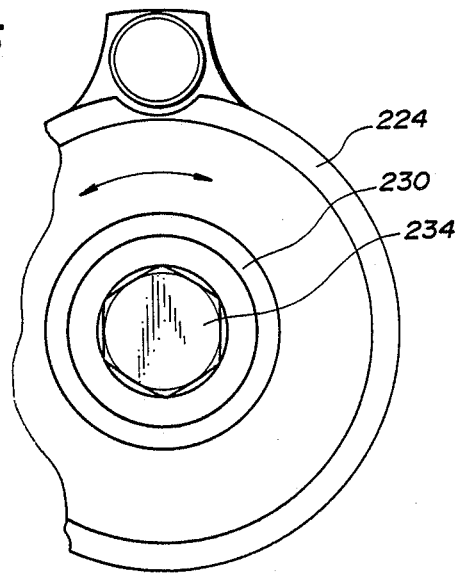

Next, FIGS. 14 and 15 illustrate the fifth embodiment of the present invention wherein like reference numerals designate like or corresponding parts in said fourth embodiment, and the description of elements and the operation common to that of the fourth embodiment is omitted. The fifth embodiment differs from the fourth embodiment in that rotation of the knob 30 is not carried out by a tool such as a screwdriver, but by a lug wrench. More specifically, the knob 230 is provided with hexagonal prism-like projection 234 that is substantially identical to the lug nut 220 of a tire. Hence, a conventional lug wrench may be used to turn the knob 230 easily because a sufficient force can be easily produced by using such a lug wrench, and, there is no need to purchase a special tool such as a screwdriver or the like. Furthermore, since the profile of the projection 234 is substantially identical to that of a lug nut 220 for a tire, it is not apparent that the projection 234 is a knob for manual operation. As a result, such mischief that the knob 230 is rotated by another person without any permission may be avoided.

As described above, according to the hub clutch of the present invention, when the knob is set to the automatic position, the pawl portion of the retainer becomes disengaged with the cam surface of the boss portion of said knob. When the knob is rotated in the manually locking direction, said pawl portion is engaged by the cam surface of said knob and, is cammed to the axial outside portion of said cam surface to the lock position. Said retainer positions said clutch ring in said lock position. Due to the construction of the hub clutch as described above, the clutching spline and the drive gear are prevented from being disengaged when the vehicle is moved forwardly and backwardly when in automatic four-wheel drive. Accordingly, the hub clutch of the present invention eliminates various problems associated with two-wheel drive starting and in addition wear of the brake can be inhibited even when in four-wheel drive.

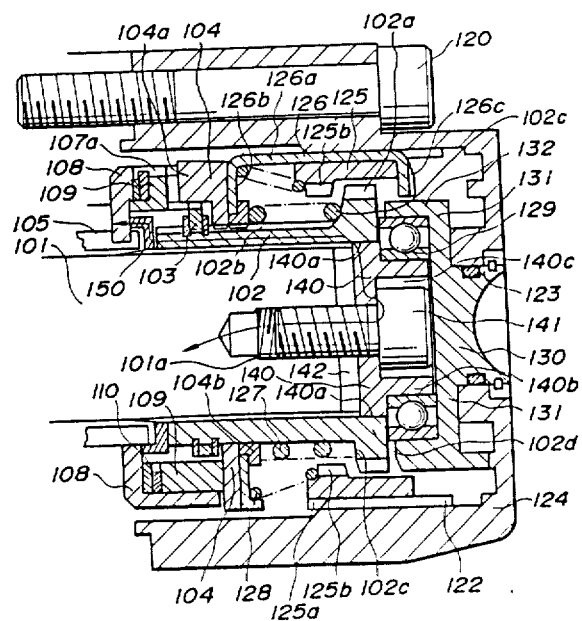

I claim:

1. A hub clutch for selectively transmitting torque between an axle shaft extending in an axial direction and a wheel hub, said hub clutch comprising:
   a cylindrical casing fixed to the wheel hub,
   said cylindrical casing having an inner peripheral surface, an outer end, a spline extending along said inner peripheral surface, and an opening extending through said outer end;
   a knob rotatably mounted to said casing in the opening extending therethrough, said knob having a boss portion extending within said casing, said boss portion defining a cam surface having an axial inner portion and an axial outer portion, said cam surface inclined from the axial inner portion to the axial outer portion thereof;
   a drive gear secured to the axle shaft at an end thereof,
   said drive gear having both a gear portion and a spline extending on the outer periphery thereof, and a stepped portion;
   a cam member in splined engagement with the spline of said drive gear so as to be movable along said drive gear in the axial direction, said cam member having a cam portion projecting toward an inner side of the hub clutch;
   an outer brake means adjacent said cam member, said outer brake means having a grooved cam portion engageable with the cam portion of said cam member;
   a stationary system connected to said outer brake for preventing said outer brake means from rotating;
   an inner brake disposed within said outer brake means,
   said inner brake having a grooved first cam portion engageable with the cam portion of said cam member, and second cam portions each of which is disposed at a respective one of opposite sides of said grooved first cam portion;
   a clutch ring in splined engagement with the spline of said cylindrical casing so as to be movable along said inner casing in the axial direction, said clutch ring movable to a clutching position at which said clutch ring engages the gear portion of said drive gear;
   a return spring extending between said cam member and the stepped portion of said drive gear and urging said cam member toward the inner side of the hub clutch in the axial direction;
   a retainer slidably mounted in the hub clutch and contacting said cam member, said retainer having a pawl portion engageable with the cam surface of said knob; and
   a shift spring extending between said clutch ring and said retainer.

2. A hub clutch as claimed in claim 1,
   wherein said outer brake means comprises a friction surface, and said inner brake has a braking surface engaging said friction surface for producing a braking force when said inner brake rotates relative to said outer brake means.

3. A hub clutch as claimed in claim 1,
   wherein said outer brake means has an inner peripheral surface and a V-shaped groove extending in said inner peripheral surface, and said inner brake has a projecting portion, and further comprising a wire brake extending in said V-shaped groove, said wire brake having end portions which extend from said V-shaped groove radially inwardly in the hub clutch, and a release plate mounted to said drive gear and having an arm, the arm of said release plate and the projecting portion of said inner brake engageable with the end portions of said wire brake.

4. A hub clutch as claimed in claim 1,
   wherein said drive gear has a locational portion defined at an end thereof, the locational portion having an inner peripheral surface, and
   further comprising a locational member bolted to said axle, said locational member engaging said drive gear at the inner peripheral surface of said locational portion thereof, and said locational member having a bearing supporting surface, and
   a bearing disposed between the bearing supporting surface of said locational member and an inner peripheral surface of the boss portion of said knob.

5. A hub clutch as claimed in claim 2,
   wherein said drive gear has a locational portion defined at an end thereof, the locational portion having an inner peripheral surface, and
   further comprising a locational member bolted to said axle, said locational member engaging said drive gear at the inner peripheral surface of said locational portion thereof, and said locational member having a bearing supporting surface, and a bearing disposed between the bearing supporting surface of said locational member and an inner peripheral surface of the boss portion of said knob.

6. A hub clutch as claimed in claim 3, wherein said drive gear has a locational portion defined at an end thereof, the locational portion having an inner peripheral surface, and further comprising a locational member bolted to said axle, said locational member engaging said drive gear at the inner peripheral surface of said locational portion thereof, and said locational member having a bearing supporting surface, and a bearing disposed between the bearing supporting surface of said locational member and an inner peripheral surface of the boss portion of said knob.

7. A hub clutch for selectively transmitting torque between an axle shaft extending in an axial direction and a wheel hub, said hub clutch comprising:

a cylindrical casing fixed to the wheel hub, said cylindrical casing having an inner peripheral surface, an outer end, a spline extending along said inner peripheral surface, and an opening extending through said outer end, a knob rotatably mounted to said casing in the opening extending therethrough, said knob having a boss portion extending within said casing, said boss portion defining a cam surface having an axial inner portion and an axial outer portion, said cam surface inclined from the axial inner portion to the axial outer portion thereof;

a drive gear secured to the axle shaft at an end thereof, said drive gear having both a gear portion and a spline extending on the outer periphery thereof, and a stepped portion;

a cam member in splined engagement with the spline of said drive gear so as to be movable along said drive gear in the axial direction, said cam member having a cam portion projecting toward an inner side of the hub clutch;

a clutch ring in splined engagement with the spline of said cylindrical casing so as to be movable along said inner casing in the axial direction, said clutch ring movable to a clutching position at which said clutch ring engages the gear portion of said drive gear;

brake means for generating a braking force to move said clutch ring in the axial direction to said clutching position in response to rotation of the axle shaft, said brake means comprising a cam means engaging the cam portion of said cam member, and a stationary member;

a return spring connected to said clutch ring and urging said clutch ring in the axial direction out of said clutching position;

a retainer slidably mounted in the hub clutch and contacting said cam member, said retainer having a pawl portion engageable with the cam surface of said knob; and a shift spring extending between said clutch ring and said retainer.

* * * * *

UNITED STATES PATENT AND TRADEMARK OFFICE
CERTIFICATE OF CORRECTION

PATENT NO. : 4,811,824

DATED : March 14, 1989

INVENTOR(S) : Sakuo Kurihara

Figure 2B:
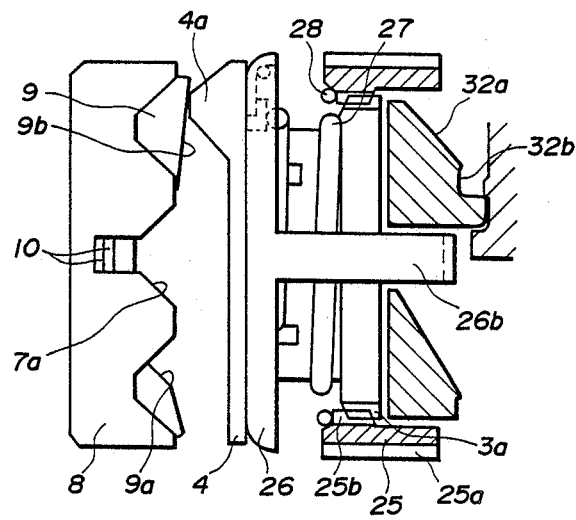
Figure 3:
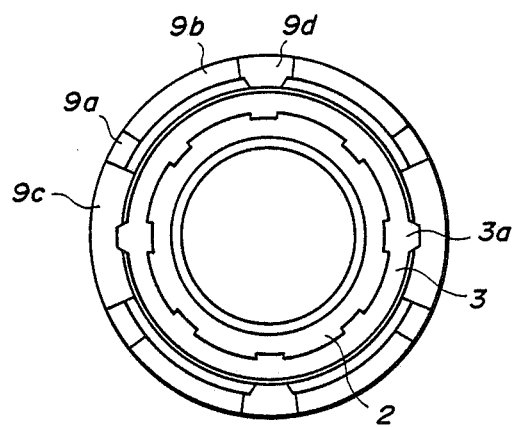
FIGS. 3(a) and 3(b) are cross-sectional views each showing an engaged state of a projection of an inner brake and a projection of a release plate in a clutching-off and a clutching-on condition, respectively.
Figure 3:
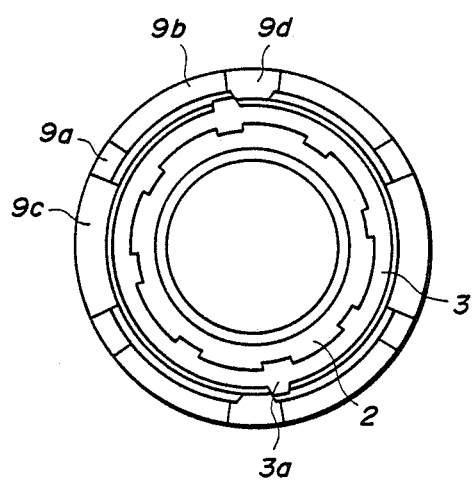

It is certified that error appears in the above-identified patent and that said Letters Patent is hereby corrected as shown below:

In Fig. 2(b) reference numeral 3a has been changed to 2a;

Fig. 7 has been replaced with Fig. 7 as shown on the attached page.

Signed and Sealed this

Sixth Day of March, 1990

Attest:

JEFFREY M. SAMUELS

Attesting Officer

Acting Commissioner of Patents and Trademarks

UNITED STATES PATENT AND TRADEMARK OFFICE
CERTIFICATE OF CORRECTION

PATENT NO. : 4,811,824

DATED : March 14, 1989

INVENTOR(S) : Sakuo Kurihara

It is certified that error appears in the above-identified patent and that said Letters Patent is hereby corrected as shown below:

Fig.7